Figure 1:
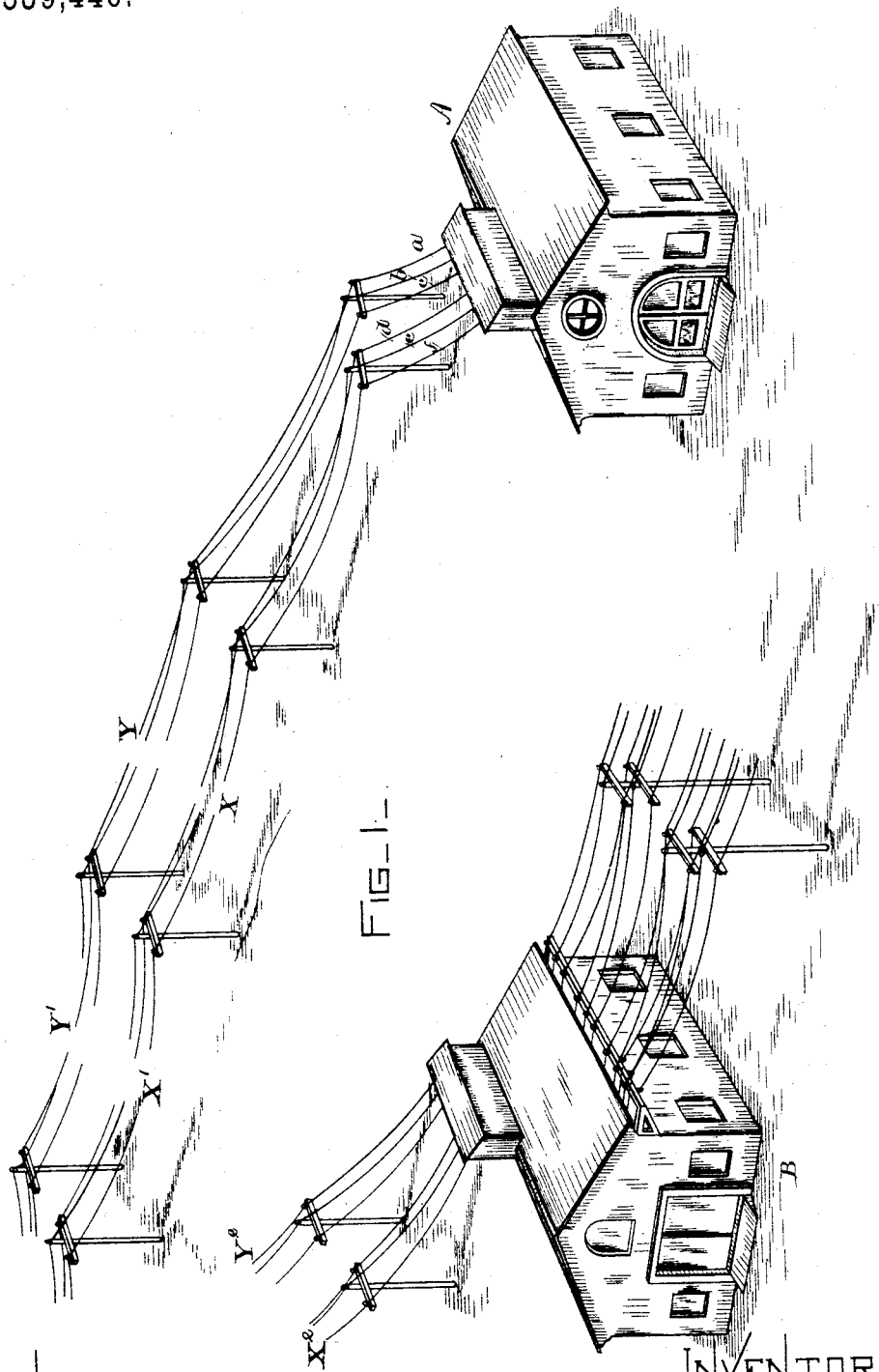

(No Model.) 2 Sheets—Sheet 1.

E. W. RICE, Jr.
SYSTEM OF ELECTRICAL DISTRIBUTION.

No. 539,446. Patented May 21, 1895.

WITNESSES
INVENTOR

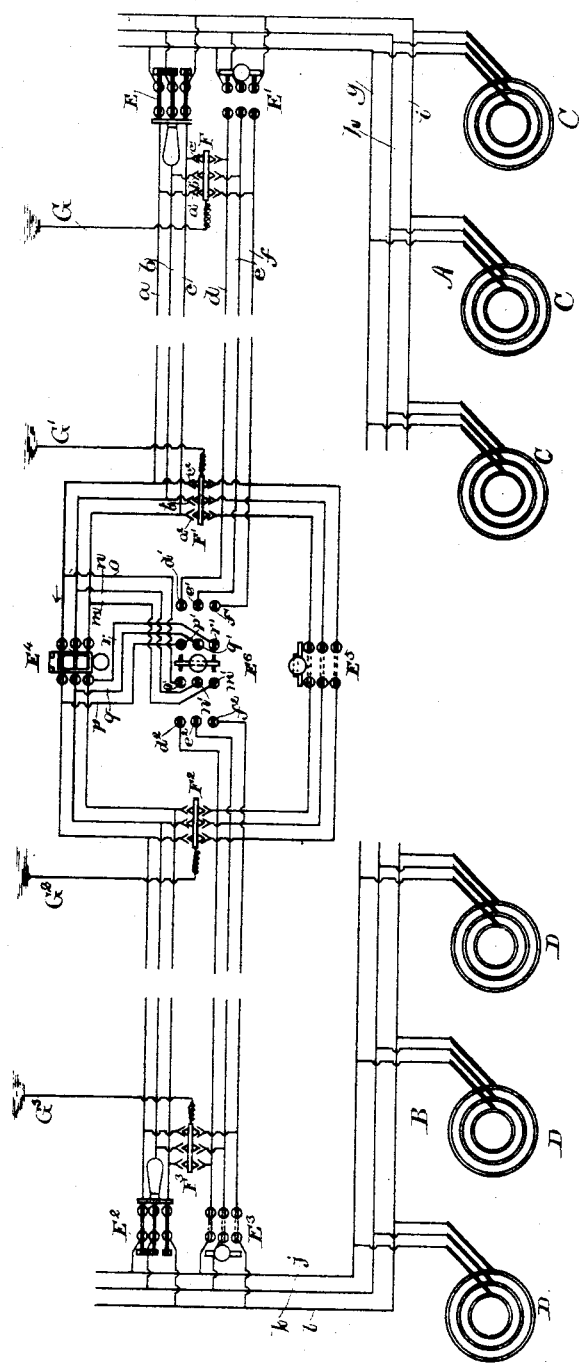

UNITED STATES PATENT OFFICE.

EDWIN WILBUR RICE, JR., OF SWAMPSCOTT, ASSIGNOR TO THE GENERAL ELECTRIC COMPANY, OF BOSTON, MASSACHUSETTS.

SYSTEM OF ELECTRICAL DISTRIBUTION.

SPECIFICATION forming part of Letters Patent No. 539,446, dated May 21, 1895.

Application filed May 24, 1893. Serial No. 475,356. (No model.)

*To all whom it may concern:*

Be it known that I, EDWIN WILBUR RICE, Jr., a citizen of the United States, residing at Swampscott, in the county of Essex and State of Massachusetts, have invented a new and useful Improvement in Systems of Electrical Distribution, of which the following is a specification.

My invention relates to systems of electrical distribution in which power is transmitted by means of currents of very high potential, and its principal object is to provide means whereby sections of the circuit may be cut out, when necessary, so that repairs can be made without danger of injury by shock to the workmen.

In systems of the kind to which my invention especially applies, it is customary to carry currents over a main circuit from a generating or power station, to a receiving station, where it is fed to transformers or motor generators, and thence to the work circuit. My invention is particularly adapted to circuits such as these, or others carrying currents of high potential where the element of danger in handling the wires is very considerable.

In carrying out my invention, I provide instead of a single circuit between the generating and receiving stations, two or more circuits connected in multiple. It is obvious that with this arrangement either circuit may be cut out entirely, if repairs are necessary therein, while the entire current can meanwhile be carried over the remaining circuit. In case, however, the distance between the generating and receiving stations is considerable, as is usual in such systems as the one herein described, it is obvious that if the full current were to be carried on a single circuit where two circuits in multiple are normally employed, the line losses would be great. I therefore divide up the said circuits into sections of suitable length, and provide switches and cross connections whereby the two circuits can be connected so that except for the cut out section, the multiple circuit can still be employed. As a still further safeguard additional switches are provided whereby the section cut out can be grounded at either or both ends.

In the accompanying drawings, Figure 1 is a diagram showing the circuits employed in carrying out my invention. Fig. 2 is a diagram showing in detail the switches and cross connection.

Referring to Fig. 1, the generating station A is connected to the receiving station B by the two circuits formed respectively of the wires $a, b, c$, and $d, e, f$, said circuits representing a three phase system, although it is obvious that the ordinary three wire system might be employed in the same manner. These two circuits may be carried on one line of poles, if desired, but it is essential that they be some distance from each other so as to minimize the danger of accidental cross-connections between them. It is preferable however, to have them carried on separate lines of poles, as shown in Fig. 1, as they can in this way be placed so far apart as to render such danger practically *nil*. The breaks in the line at X, Y, X', Y', and $X^2$, $Y^2$ represent the ends of sections into which the line is divided. If for example, there were need of repairs upon that section of the circuit $a, b, c$, between the power station A and the break X, Y at the end of the said section that portion of the circuit could be cut out by suitable switches, and the section between the power station and the break X, Y comprising the circuit $d, e, f$, can be connected across to the circuit $a, b, c$, so that the current between the generating stations and the point X, Y could be carried over the wires $d, e, f$, and from X, Y by means of cross-connections over the lines $a, b, c$ and $d, e, f$ in multiple to the receiving station. With the current thus divided at X, Y and carried in multiple over the two circuits, the only portion of the entire main circuit left idle is that portion of the wires $a, b, c$, included in the first section between the generating station A and the point X Y.

Referring to Fig. 2, generators C feed current into the bus bars $g, h, i$, and from these bus-bars two circuits are led out comprising the wires $a, b, c$, and $d, e, f$, respectively, connected in multiple. These circuits in turn connect with the bus-bars $j, k, l$, at the receiving station which feed the motor generators D. Switches E, E' connect the said circuits $a, b, c$, and $d, e, f$, to the bus bars $g, h, i$, and corresponding switches $E^2$ $E^3$ at the other end of said circuits connect them to the bus-bars $j, k, l$, leading to the motor generators. If the arrangement were simply this it is obvious that either circuit might be entirely cut out pending repairs on the other. For the reasons above stated, however, this is undesirable, and the circuit is therefore divided up into sections connected together by switches $E^4$ and $E^5$ corresponding to the switches $E, E', E^2, E^3$, aforesaid. In addition to the said switches $E^4$ and $E^5$ cross connections between the two circuits comprising the wires $m, n, o$, and $p, q, r$, respectively, are provided, and a double switch $E^6$ normally open, is adapted to make the desired connections. The operation of the said cross-connections and switch $E^6$ is as follows: If, for example, repairs are to be made in that section of the circuit which is between the switches $E'$, and $E^5$, the said switches are opened, as shown in the drawings, while the switch $E^6$, is thrown to the left, so as to connect the terminals $m' n' o'$ of the wires $m, n, o$, respectively to the terminals $d^2, e^2, f^2$, of the wires $d, e, f$. The circuit is then as follows: Bus-bars $g, h, i$, to wires $a, b, c$, through closed switch $E$, to wires $m, n, o$, where it divides, half continuing over wires $a, b, c$, through closed switches $E^4$ and $E^2$ to the bus-bars $j, k, l$, and motors D, and half through wires $m, n, o$, and switch $E^6$ to wires $d, e, f$, and closed switch $E^3$ to bus-bars $j, k, l$, and motors. If the other part of the same section of the circuit is to be cut out, the switches $E$ and $E^4$ are opened, while switches $E', E^6, E^2$ and $E^3$ are closed. The switch $E^6$ now being thrown to the right so as to connect the terminals $d', e', f'$, respectively to the terminals $p', q', r'$, the circuit can be traced as before; that is, from the generators C to the switch $E^6$ over the single circuit comprising the wires $d, e, f$, and thence over both circuits in multiple to the motors D. As an additional safeguard it is desirable to ground the ends of the circuits thus cut out, and for this purpose switches $F, F', F^2, F^3$ are provided. If now that section of the circuit between the switches $E$ and $E^4$ is cut out by opening said switches, the switch terminals $F$ and $F'$ leading to ground through wires G and G' are connected respectively to the terminals $a', b', c'$, and the terminals $a^2, b^2, c^2$, of the wires $a, b, c$, at the ends of the section, thereby grounding the said section, and completely obviating the possibility of current flowing therein. The function of the ground terminals $F^2$ and $F^3$ are obviously the same, and require no further explanation.

When the circuit is in its normal condition, the switches $E, E', E^2, E^3, E^4$ and $E^5$ are all closed, while the cross-connection switch $E^6$ and the ground switch terminals $F, F', F^2$ and $F^3$ are all in neutral positions, as shown in the drawings. The circuit then flows in multiple over the sets of wires $a, b, c$, and $d, e, f$, from the bus bars $g, h, i$, to the bus bars $j, k, l$.

In the drawings, but one system of cross-connections is shown, as if the line were divided into two sections only; but it is obvious that there may be any number of sections desired. If, for example, instead of the simple connection at the switches $E^2$ and $E^3$ there were cross-connections similar to those shown in connection with switches $E^4$ and $E^5$, the method of cutting out the intermediate section would be the same as above described, it being necessary only to operate the cross connection switch at the other end of the section corresponding to the switch $E^6$, in addition to the switch $E^6$ itself.

What I claim as new, and desire to secure by Letters Patent, is—

1. A system of electrical distribution, comprising separate circuits connected in multiple, switches at intervals along said circuits whereby sections of any of said circuits may be open circuited, and cross-connections around said open-circuited sections, whereby the remaining sections of the circuit containing said open-circuited section may be connected in multiple with the other circuits as described.

2. A system of electrical distribution for high potential currents, comprising two separate circuits connected in multiple, switches at intervals along each of said circuits whereby sections of either may be cut out, normally open-circuited cross-connections between sections on one circuit and consecutive sections on the other, and switches in said cross-connections, whereby the same may be closed-circuited and the two circuits connected in multiple at either or both ends of the open-circuited section, as described.

3. In a system of electrical distribution, a main circuit comprising two circuits connected in multiple, switches at intervals along said circuits, whereby said main circuit is divided into sections, normally open cross-connections respectively connecting the circuits in one of said sections with the opposite circuits in the next section, a two-way switch whereby either of said cross connections may be closed-circuited, and ground terminals at the ends of said sections adapted to be connected to either of said circuits, substantially as and for the purpose described.

4. In a system of electrical distribution by alternating currents of very high potential, a generating station of said currents, a receiving station where such currents are transformed to lower potential and then distributed over local supplying circuits, multiple main circuits supported upon separate or individual pole structures connecting said stations, main line switches for cutting out of circuit sections of one or the other of said main circuits, and means for connecting the cut-out sections of the mains to earth, as described.

In witness whereof I have hereunto set my hand this 19th day of May, 1893.

EDWIN WILBUR RICE, JR.

Witnesses:
JOHN W. GIBBONEY,
BENJAMIN B. HULL.